United States Patent [19]

Downing et al.

[11] 4,049,145
[45] Sept. 20, 1977

[54] REVERSIBLE AND VARIABLE SPEED DRIVE MEANS FOR CONVEYORS AND BEATERS ON A FORAGE WAGON

[75] Inventors: James H. Downing, Mineral; Harold F. Bear, Timberville, both of Va.

[73] Assignee: Bear Industries, Inc., Alexandria, Va.

[21] Appl. No.: 670,917

[22] Filed: Mar. 26, 1976

[51] Int. Cl.² .............................................. B60P 1/38
[52] U.S. Cl. .................................. 214/519; 214/83.14
[58] Field of Search ............................... 214/519–522, 214/83.14, 83.36

[56] References Cited

U.S. PATENT DOCUMENTS

| | | | |
|---|---|---|---|
| 2,740,247 | 4/1956 | Worrell | 56/122 |
| 3,035,729 | 5/1962 | Soares et al. | 214/519 |
| 3,214,049 | 10/1965 | Grove | 214/519 |
| 3,241,841 | 3/1966 | Kucera | 239/658 |
| 3,275,176 | 9/1966 | Kasten | 214/83.14 X |
| 3,512,668 | 5/1970 | Raitch | 214/83.26 X |
| 3,595,289 | 7/1971 | Greiner | 214/83.36 X |
| 3,722,277 | 3/1973 | Fell et al. | 74/220 |
| 3,804,279 | 4/1974 | Braunberger et al. | 214/83.14 X |

*Primary Examiner*—Robert J. Spar
*Assistant Examiner*—Carl Rowold
*Attorney, Agent, or Firm*—Sughrue, Rothwell, Mion, Zinn and Macpeak

[57] ABSTRACT

An agricultural wagon has a frame which carries an enclosure. An unloading assembly on one end of the enclosure has a power source, and end axles have an endless unload conveyor trained thereabout. The axles are chain and sprocket driven from the power source, by reversible direction drive assembly. A pipe is journaled across the assembly and is selectively engaged for rotation by a variable speed drive which includes speed regulating means, the pipe serving to actuate floor webs which move material to be unloaded forwardly in the enclosure to the unload conveyor.

A series of beaters are mounted between the sides of the unloading assembly, and are actuated from the power source.

2 Claims, 9 Drawing Figures

4,049,145

REVERSIBLE AND VARIABLE SPEED DRIVE MEANS FOR CONVEYORS AND BEATERS ON A FORAGE WAGON

BACKGROUND OF THE INVENTION

1. Field of the Invention

The invention pertains to a self-unloading wagon principally employed in agricultural environments of use.

2. Statement of the Prior Art

Unloading wagons have been heretofore proposed, and previous attempts to provide variable speed floor conveyors are also known to the art.

SUMMARY OF THE INVENTION

Self-unloading conveyors perform a function which requires that the unloading speed of the wagon be a function of the speed of other conveying means used therewith, for example, silo blowers and the like. The present invention relates to a compact variable speed drive for adjusting the speed of movement of material within the wagon to that of the unloading function thereof. In this connection, it should be noted that power must flow in two different directions and at variable speed in order to accomplish this function.

In the present invention, power is supplied from a prime mover or by a separate actuation system attached directly to a shaft which powers the adjustable drive means of the wagon. It is important that the drive be such that variation in speed of the unload mechanism be matched to speed of the movement of material within the enclosure of the wagon. It is a principally important feature of the invention that the drive mechanism be centered relative to the unloading mechanism in that this positioning allows the variable speed drive mechanism to be concentrated on two shafts with power output in different directions. It also permits the unit of the present invention to be variable as to direction of discharge.

This invention also provides removable beaters which are driven by the same mechanism.

A further objective of the invention resides in the utilization of a pipe drive which eliminates shear pins and other undesirable features found in different types of drives.

Other and further objects and advantages of the invention will become apparent to those skilled in the art from a consideration of the following specification when read in conjunction with the annexed drawings.

DESCRIPTION OF THE PREFERRED EMBODIMENT

Figure 1:
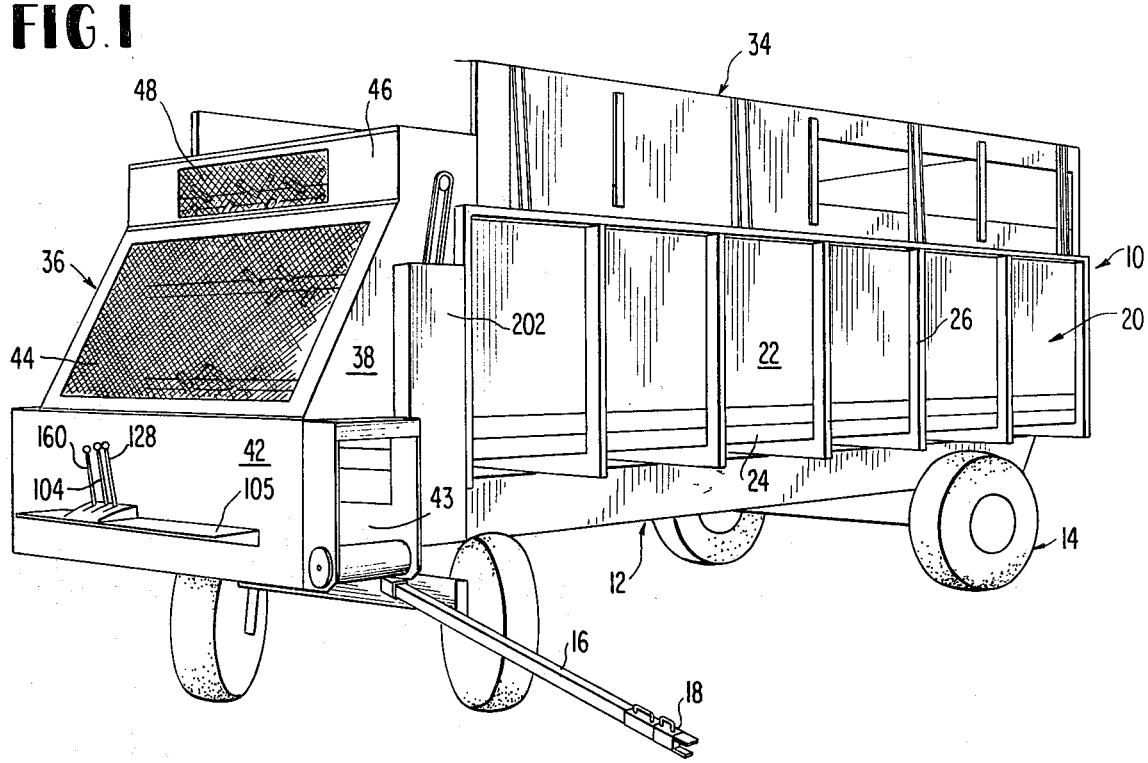
FIG. 1 is a perspective view of an agricultural wagon constructed and assembled in accordance with the teachings of this invention.

Referring to the drawings in more detail, FIG. 1 discloses a wagon 10 according to this invention which comprises a basic frame 12 with ground wheels 14. A drawbar 16 is provided at the forward end of the frame, with a hitch 18 for connection with a prime mover such as a tractor or the like.

Figure 2:
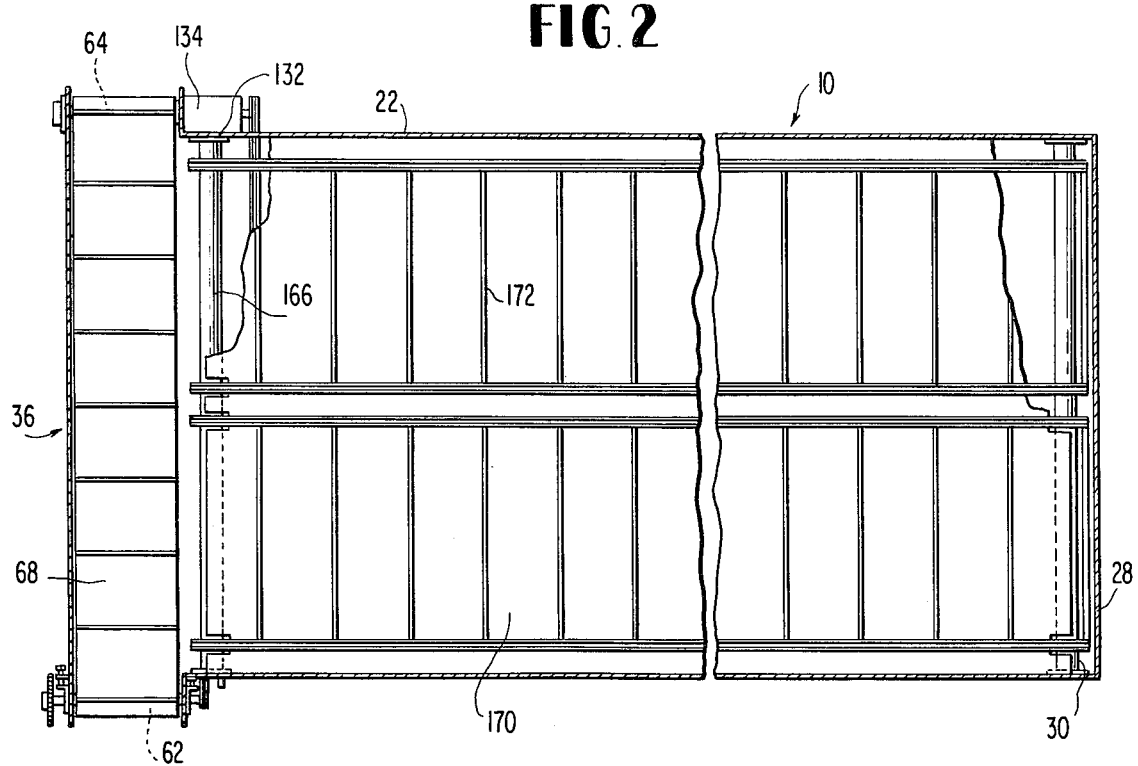
FIG. 2 is a top view, partially in cross-section and partially broken away for disclosure of details.

An enclosure 20 of the wagon consists of sides 22 and a bed 24 with rigidifying braces 26. The enclosure is further defined by a rear wall 28 (FIG. 2), and brackets 30 secure a rotatable web axle 32 across the bed 24 adjacent the rear wall, for a purpose appearing below.

Removable top panels 34 may be optionally employed to increase capacity where lightweight materials are to be transported.

The present invention employs a new and novel unloading assembly 36. The assembly is housed at the forward end of the wagon 10, by side walls 38, 40, and forward and rear walls 42, 43. A slant screen 44 spans the side walls, to permit the tractor operator to observe the wagon contents, and a top panel 46 also has a screened opening 48. A top section 50 avoids spillage from the assembly.

Figure 5:
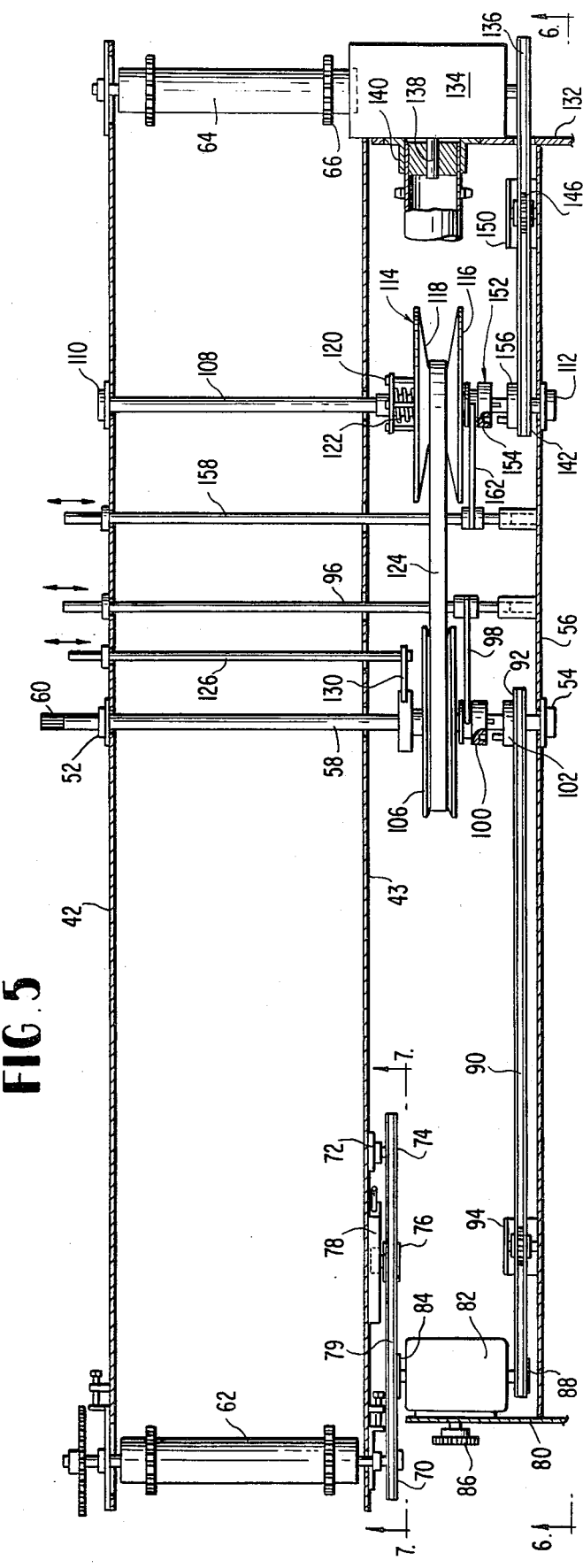
FIG. 5 is an enlarged view of the unloading assembly with some portions broken away and removed.
Figure 6:
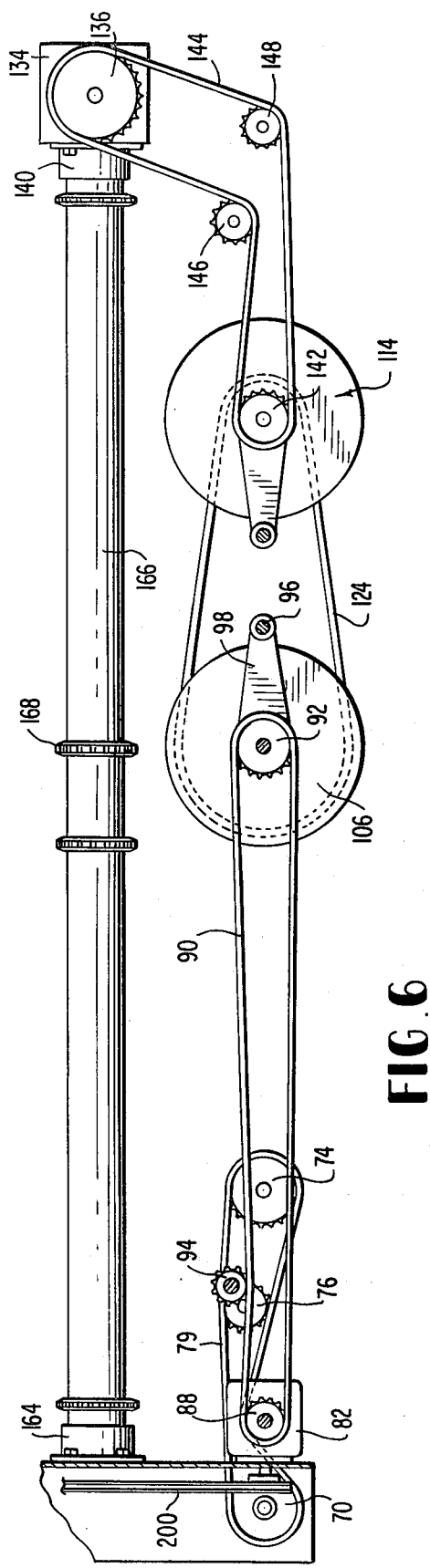
FIG. 6 is a rear view of the unloading assembly as seen from line 6 — 6 of FIG. 5, looking in the direction of the arrows.

In FIG. 5, the details affecting operation of the unloading assembly are more fully shown. Extending through the assembly forward wall 42 in a bearing 52 and seated in a bearing 54 on the front wall 56 of the wagon frame 12 is an elongated power input shaft 58. The shaft is splined at 60 for connection to the prime mover power take-off output shaft, or other power source such as a hydraulic motor or the like.

Journaled rotatably between the forward and rear walls 42, 43 are axles 62 and 64. On these axles are toothed sprockets 66, and an endless belt conveyor 68 (FIGS. 2 and 3) is trained thereabout and driven by the sprockets. It will be observed in FIG. 5 that the axle 62 is extended through the wall 43 and has a driven gear or sprocket 70. Inwardly spaced and mounted in a bearing 72 on the wall 43 is a tension gear 74 of similar dimension, and an idler gear 76 of reduced diameter is mounted on the wall in a bearing bracket 78 which permits adjustable positioning thereof. A chain 79 is extended about the sprocket 70 and gear 74 as described more fully below. Secured suitably on an extension 80 of the adjacent side wall 22 of the enclosure is a reduction gearbox 82 having a first output gear 84 in alignment with gears 72, 74 and 76. The box 82 also has an output gear 86, and an input sprocket 88. The drive chain 90 extends from a driven sprocket 92 on the power input shaft 58 and drives the input gear 88 of the reduction gearbox 82. An idler gear 94 is mounted on the wall 56 to maintain desired tension on the drive chain 90.

A control for the engagement or disengagement of drive of the sprocket 92 comprises a rod 96 mounted for longitudinal front to rear movement between the walls 42 and 56, and carrying a lever 98. The lever 98 is secured to a clutch half 100 engageable with a clutch half 102 on the sprocket 92. With the clutch disengaged as shown in FIG. 5, the sprocket is immobilized, but actuation of the rod to engage the clutch turns the sprocket.

Control of the rod 96 is through an operating lever 104 (FIG. 1) mounted on a ledge 105 on the front of the assembly.

Mounted on said power input shaft forwardly of the clutch 100, 102 is a manually adjustable main drive pulley 106. A floor web drive shaft 108 extending between bearings 110, 112 in the walls 42 and 56 carries a variable diameter pulley 114 comprising opposing wedge members 116, 118 with brackets 120 and a spring 122. A V-belt 124 is trained about the pulleys 106 and 114, the spring 122 exerting constant force to move the wedge members toward one another. A control rod 126 is longitudinally movable by manipulation of a handle 128 to move a lever 130 and thereby vary the effective diameters of the sheave or pulley 106. Through actuation of this, the speed of the shaft 108 is selectively variable, inasmuch as the pulley 114 adjusts as to diameter as a function of the diameter of the pulley sheave 106. Mounted on an extension 132 of one of the side walls of the wagon enclosure is a reduction gearbox 134 of substantial lesser reduction capacity than the box 82. For example, if the box 82 operates at a reduction ratio of 50:1, the box 134 operates at a reduction ratio of 5:1. The box 134 has an input sprocket and shaft 136, and an output shaft 138 movably mounted within a flange 140.

The box 134 is actuated from the shaft 108. On said shaft is a sprocket 142. A chain 144 extends about the sprockets 136 and 142, and proper tension is maintained by adjustable idlers 146 and 148 mounted in adjustment brackets 150 on the wall 56.

The movement of the sprocket 142 which is freely mounted on the shaft 108 is controlled by a clutch 152 comprising clutch halves 154 and 156. A longitudinally movable rod 158 is maintained between the walls 56 and 42 and its movement is controlled by a handle 160. The rod 158 has a perpendicularly mounted lever 162 to move the clutch halves into or out of engagement.

Figure 4:
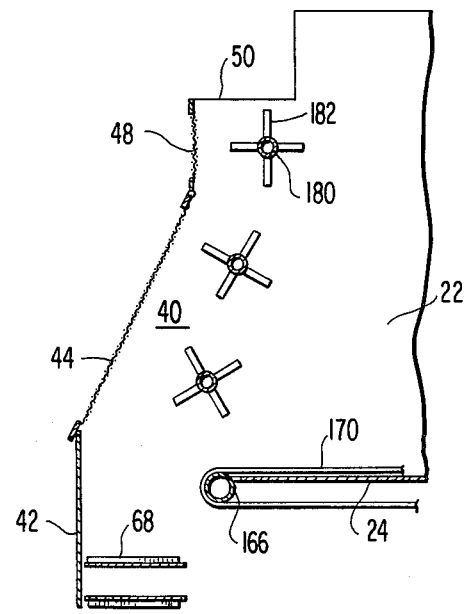
FIG. 4 is a view similar to FIG. 3, but with the enclosure wall removed, and in cross-section.

Extending from the flange 140 transversely across the front of the wagon, and rotatably mounted in a second side flange 164 is a pipe member 166 having sprockets 168 aligned with similar sprockets on the web axle 32. Trained about the pipe member and web axle are endless floor webs 170 (FIG. 2) which have extended lattices 172. The webs serve to convey material within the wagon forwardly for unloading when the pipe drive system is engaged. In FIG. 4, it will be noted that the unloading conveyor 68 is located somewhat below the plane of the webs 170 whereby material discharged from the webs gravitates onto the conveyor 68.

Figure 7A:
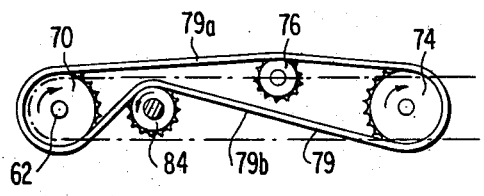
FIGS. 7A and 7B are diagrammatic sketches of the unload conveyor drive showing alternate directional conditions, from line 7 — 7 of FIG. 5.
Figure 7B:
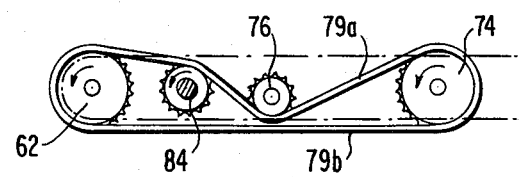

FIGS. 7A and 7B show the means whereby the direction of unloading of the conveyor 68 is variable. The chain 79 is trained about the sprocket 70 and gear 74. Its contact however with the output gear 84 and idler 76 is variable depending upon the direction of rotation desired. In a first direction (FIG. 7A), the upper flight 79a of the chain passes over the idler 76 and is out of contact with the gear 84 which is constantly rotating in counterclockwise direction. The lower chain flight 79b then passes thereover, which results in clockwise rotation of the sprocket and gear 74. When reversal of direction is required, the chain is removed and the idler gear is moved downwardly and in the direction of the output gear 84. The chain upper flight then passes under the idler and over the output gear. The lower flight 79b does not contact either, resulting in counterclockwise movement of the sprocket and gear.

Figure 8:
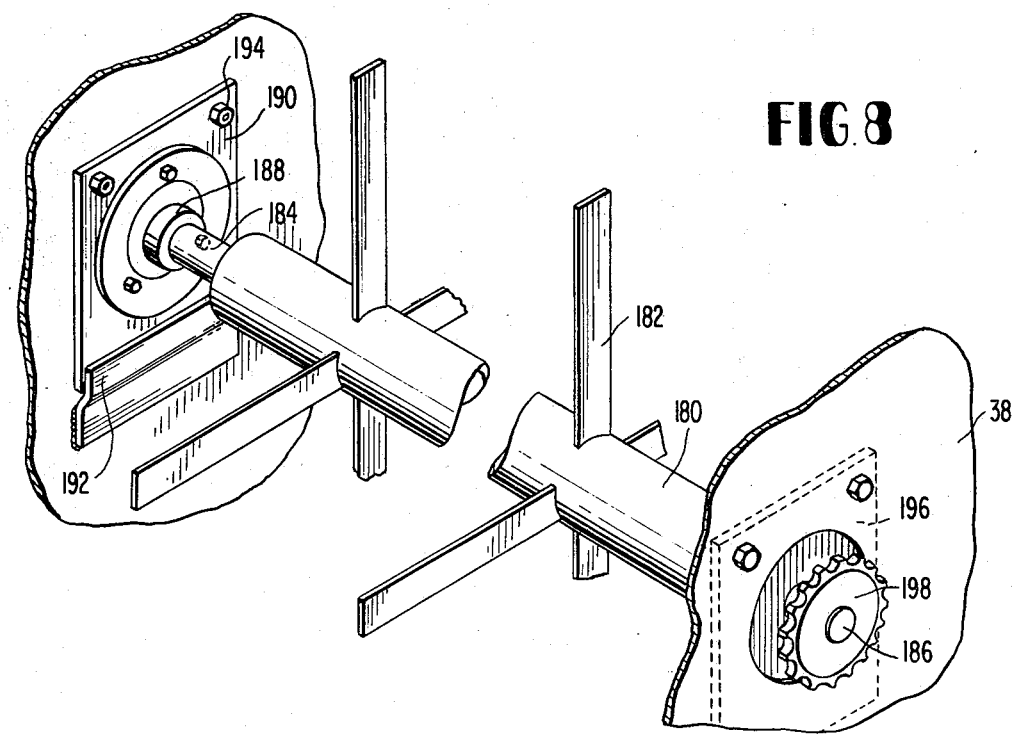
FIG. 8 is an enlarged, foreshortened perspective view of one of the beaters.
Figure 3:
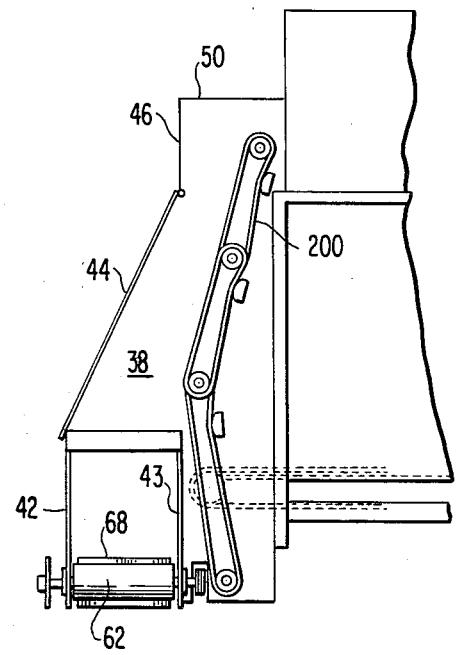
FIG. 3 is a side view of the unit of FIG. 2, the side cover plate being removed to show details.

A further novel feature of the invention resides in the beater assemblies employed to avoid compacting of material and to facilitate discharge. The beaters are so mounted as to be readily removable. Referring to FIG. 8 it will be observed that the beaters (illustratively three in number), each comprise a tubular shaft 180 having a series of blades 182 extending radially therefrom. Stub axles 184 and 186 extend from each shaft, and the axles 184 have end bearings 188. An end bracket 190 seats in a lip 192 fixedly secured to the assembly side wall, and is secured by removable fasteners 194. A second similar bracket assembly 196 is provided on the opposite wall, but the stub axle 186 projects through the wall and has a gear wheel 198 thereon. The gear wheel is on the outer side of the wall. In FIG. 3 it is seen that a series of chains 200 connect these gear wheels in driven relation to the output gear 86 on the reduction gearbox 82. A protective shield or cover plate 202 is removably secured to the assembly to protect the chains and gears. Thus, the beaters operate when the unloading conveyor is actuated.

We claim:

1. A self-unloading argicultural wagon comprising:
   a frame having a frame front wall and having an enclosure, the frame having forward and aft ends;
   an unloading assembly on the forward end of the frame;
   the unloading assembly including side walls and forward and rear walls;
   a power input shaft journaled between the forward and front walls and adapted to be driven by the power take-off output shaft of a prime mover for the wagon;
   a pair of end axles journaled between said forward and rear walls of the unloading assembly and carrying sprockets;
   a driven gear fixed to one of said axles;
   an endless unload conveyor trained about said axles and having chain means engaged by said sprockets;
   a reversible direction drive for said unload conveyor disposed between said frame front wall and said unloading assembly rear wall, and comprising a drive gear, a tension gear, and an idler gear, all aligned with said driven gear, and a chain extending transversely of the wagon and changeably trained about the drive gear and idler gear to vary the direction of rotation of the tension and driven gears and thereby change the direction of movement of the conveyor;
   a variable speed drive disposed between said frame front wall and said unloading assembly rear wall and comprising drive means connecting the drive gear and the power input shaft, an adjustable first main drive pulley on said power input shaft, a variable diameter pulley on a floor web drive shaft journaled between the forward and front walls, and a belt extending transversely of the wagon and connecting said main drive and variable diameter pulleys;
   an elongated pipe drive disposed above said reversible and variable speed drive and rotatably journaled between the side walls of the unloading assembly, said pipe drive being connected to said floor web drive shaft; and
   endless floor webs disposed above said unload conveyor within said enclosure and driven forwardly by said pipe drive to deliver material in the enclosure to said unload conveyor.

2. The invention of claim 1, wherein said drive means includes reduction gear means having a drive sprocket, and further comprising a plurality of beater assemblies mounted one above the other on said side walls of the unloading assembly; each assembly comprising: a pair of brackets secured to the side walls, a cross axle rotatably mounted in said brackets, and blades projecting from said cross axles; and further comprising belt means extending vertically up the side wall for mechanically coupling said drive sprocket to the cross axles, whereby said beater assemblies are rotated coincidentally with movement of said unload conveyor.

* * * * *